Patented Sept. 9, 1952

2,610,207

UNITED STATES PATENT OFFICE 2,610,207

PROCESS FOR THE MANUFACTURE OF PENTAENES

Herbert Lindlar and Rudolf Rüegg, Basel, Switzerland, assignors to Hoffmann-La Roche Inc., Nutley, N. J., a corporation of New Jersey No Drawing. Application May 16, 1950, Serial No. 162,386. In Switzerland September 30, 1949

12 Claims. (Cl. 260—491)

The invention relates to improvements in the synthetic preparation of vitamin A and derivatives thereof.

Vitamin A-esters may be obtained by the process described in "Helvetica Chimica Acta," vol. XXXII, year 1949, page 489 et seq. In this process, the last steps, i. e., the allyl rearrangement and dehydration, are effected by treating the 1-acyloxy-3,7-dimethyl-6-hydroxy-9-(2',6',6'-trimethyl-cyclohexene-(1')-yl)-nonatriene-(2,4,7) with phosphorus oxychloride in the presence of pyridine, the yield of vitamin A-esters thereby amounting to about 72 per cent. of the theoretical value according to the ultra-violet absorption measurement.

It has now been found, according to the present invention, that valuable improvements can be achieved if the said reaction steps are carried out by first causing an aqueous hydrogen halide, viz. hydrobromic acid or concentrated hydrochloric acid, to act, in the cold, on a suitable starting material dissolved in a halogenated hydrocarbon having a large dipole moment, and splitting off hydrogen halide from the halogen compound formed by means of water or a basic compound. Suitable solvents for this purpose are chloroform, dichloromethane, dichloroethylene, chlorobenzene etc. The splitting off of the hydrogen halide is suitably effected by stirring with large amounts of water; however, basic agents such as quicklime, pyridine or collidine may also be employed. Besides the 1-acyl derivative of the 1,6-dihydroxy-nonatriene mentioned above other derivatives thereof can likewise be used as starting materials, particularly the 1-alkoxy derivative, and both compounds may also be acylated at the hydroxy group in 6-position.

The present invention relates to a process for the manufacture of pentaenes, comprising reacting a compound of the formula

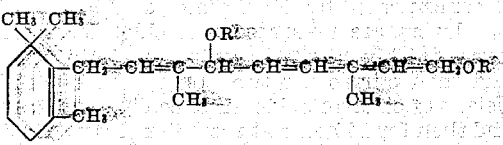

wherein R means acyl or a lower alkyl and R' acyl or hydrogen, as for instance, 1,6-diacetoxy-3,7-dimethyl-9-(2',6',6'-trimethyl-cyclohexene-(1')-yl)-nonatriene-(2,4,7), dissolved in a halogenated hydrocarbon having a large dipole moment, such as chloroform, in the cold with an aqueous hydrogen halide, viz. hydrochloric acid or hydrobromic acid, and splitting off hydrogen halide from the halogen compound obtained in the presence of water or a basic substance. The intermediarily formed halogen compound shows an absorption maximum in the ultra-violet spectrum at 283–284 mμ; it may be represented by the following formula:

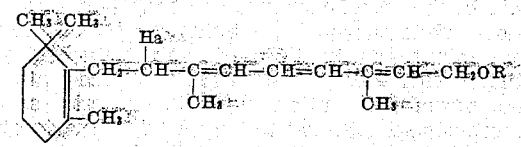

wherein Hal represents chlorine or bromine.

1-acyloxy- or 1-alkyloxy-3,7-dimethyl-6-hydroxy-9-(trimethyl-cyclohexenyl)-nonatriene respectively to be used as starting materials are known; see, for instance, "Helvetica Chimica Acta," 1. c. 1,6-diacyloxy- and 1-alkoxy-6-acyloxy compounds which may also be employed as starting materials are obtainable by the acylation of the 1,6-dihydroxy- or 1-acyloxy-6-hydroxy compound respectively.

The new process gives excellent yields of vitamin A or derivatives thereof; thus, for instance, a yield of 86 per cent. of the theory (ultra-violet absorption measurement) and of 65 per cent. of the theory of crystallized vitamin A-acetate of melting point 58–59° C. can be obtained from 1,6-diacetoxy-3,7-dimethyl-6-hydroxy-9-(trimethyl-cyclohexenyl)-nonatriene by using hydrobromic acid as halogenating agent at −10° C. and water as splitting-off agent at 0° C. The present process, furthermore, differs advantageously from those formerly described by its greater simplicity and safety.

Example 1

50 parts by weight of 1,6-diacetoxy-3,7-dimethyl-(2',6',6'-trimethyl-cyclohexene-(1')-yl)-nonatriene-(2,4,7) are dissolved in 200 parts by volume of chloroform, and the solution is cooled to −20° C. 200 parts by volume of 50 per cent. hydrobromic acid having a temperature of −10° C. are added and the mixture is immediately stirred for 4 minutes at −10° C. 1600 parts by volume of water having a temperature of 0° C. are immediately added, and the mixture is stirred for 3 hours at 0° C. At the beginning of this operation 0.5 part by weight of d,l-α-tocopherol is added; then the water is separated off. The chloroform solution is thoroughly stirred successively with 50 parts by volume of a 5 per cent. sodium bicarbonate solution and with 50 parts by volume of water. One part by volume of pyridine is added, and the solution is boiled down at a bath temperature of 50° C. under reduced pressure, finally in high vacuo. About 43 parts by weight of a yellow oil of $n_D^{22}$ 1.600 ±0.005 showing, according to the ultra-violet absorption measurement, a vitamin A-acetate content of 82–87 per cent. are obtained. By crystallizing from 50 parts by volume of alcohol at −12° C., 30-32 parts by weight of vitamin A acetate crystals of melting point 57-58° C. are obtained.

Example 2

50 parts by weight of 1-acetoxy-3,7-dimethyl-6-hydroxy-9-(2',6',6'-trimethyl-cyclohexene-(1')-yl)-(nonatriene-(2,4,7) are reacted in the same manner as described in Example 1. About 48 parts by weight of a yellow oil of $n_D^{22} 1.600 \pm 0.005$ having a vitamin A-acetate content of 80-82 per cent. (ultra-violet absorption measurement) are obtained.

Example 3

50 parts by weight of 1,6-diacetoxy-3,7-dimethyl-9-(2',6',6'-trimethyl-cyclohexene-(1')-yl)-nonatriene-(2,4,7) are dissolved in 20 parts by volume of chloroform and cooled to 0° C. 300 parts by volume of concentrated hydrochloric acid having a temperature of about $-3°$ C. are added while thoroughly stirring. After stirring for 4 minutes at about 0° C. the mixture is briefly stirred with 400 parts by volume of ice water, the chloroform solution is quickly separated and vigorously stirred for 24 hours with 400 parts by volume of water at 20° C. At the beginning of this operation 0.5 part by weight of d,l-α-tocopherol is added. The aqueous layer is separated off, the chloroform solution is thoroughly washed with 20 parts by volume of a 5 per cent. sodium bicarbonate solution, 1 part by volume of pyridine and again 0.5 part by weight of d,l-α-tocopherol is added and the mixture is boiled down under reduced pressure. Finally, the mixture is heated in high vacuo at 40° C. until its weight remains constant. About 43 parts by weight of a yellow oil of $n_D^{22} 1.600 \pm 0.005$ having a vitamin A-acetate content of 70-78 per cent. (ultraviolet absorption measurement) are obtained.

Example 4

50 parts by weight of 1-acetoxy-3,7-dimethyl-6-hydroxy-9-(2',6',6'-trimethyl-cyclohexene-(1')-yl)-nonatriene-(2,4,7) are treated in the same manner as described in Example 3. About 48 parts by weight of a yellow oil of $n_D^{22} 1.600 \pm 0.005$ having a vitamin A-acetate content of 78-82 per cent. (ultraviolet absorption measurement) are obtained.

Example 5

50 parts by weight of 1-methoxy-3,7-dimethyl-6-hydroxy-9-(2',6',6'-trimethyl-cyclohexene-(1')-yl)-nonatriene-(2,4,7) are reacted in the same manner as described in Example 1. About 45 parts by weight of an oil having a vitamin A-methylether content of 47 per cent. (ultraviolet absorption measurement) are obtained.

The vitamin A-methylether thus obtained can be crystallized from a solution of petroleum ether after a single chromatographic purification.

Example 6

50 parts by weight of 1-acetoxy-3,7-dimethyl-6-hydroxy-9-(2',6',6'-trimethyl-cyclohexene-(1')-yl)-nonatriene-(2,4,7) are dissolved in 100 parts by volume of chloroform, and the solution is cooled to 0° C.; 200 parts by volume of concentrated hydrochloric acid having a temperature of 0° C. are added, and the mixture is vigorously stirred during 3 minutes. Then the chloroform layer is separated. (After isolation, the halogeno compound formed shows a maximum at 283-284 mμ in the ultra-violet absorption-spectrum, $\epsilon = 20,000$; the compound contains 1 atom of chlorine.) 150 parts by volume of pyridine are immediately added to the chloroform solution, and the mixture is heated to 95° C. for 30 minutes. It is then cooled, 300 parts by volume of petroleum ether and 50 parts by volume of water are added to the mixture, whereupon the same is thoroughly stirred. The aqueous layer is separated, and the chloroform solution is again washed with 50 parts by volume of water and subsequently with 100 parts by volume of a 5 per cent. sodium bicarbonate solution. All aqueous layers are successively extracted with 100 parts by volume of petroleum ether each. The united petroleum ether-chloroform solutions are dried with sodium sulphate and boiled down at 60° C. under reduced pressure. 43-44 parts by weight of a vitamin A-concentrate are obtained in the form of a viscous, yellow oil of $n_D^{22} = 1.603 - 1.606$, and, on standing, said oil gradually crystallizes. The ultraviolet absorption measurement shows a vitamin A-acetate content of 88-90 per cent.

Example 7

A solution of 1 part by weight of 1-acetoxy-3,7-dimethyl-6-hydroxy-9-(2',6',6'-trimethyl-cyclohexene-(1')-yl)-nonatriene-(2,4,7) in 3 parts by weight of chloroform is vigorously stirred for 3-7 minutes at 0° C. with 8.5 parts by weight of concentrated hydrochloric acid ($d=1.6$). The two layers are separated, the chloroform solution is quickly dried over sodium sulphate, filtered and then stirred for 2 hours with 1 part by weight of calcium oxide while cooling with water and then for 24 hours at room temperature under a nitrogen atmosphere. The calcium oxide is then filtered off, 0.5 per cent. d,l-α-tocopherol are added to the filtrate, and the solution is then extracted successively with 2 parts by weight of 1.5-n hydrochloric acid, saturated sodium bicarbonate solution and water. After drying over sodium sulphate and further addition of 0.5 per cent. d,l-α-tocopherol, the solution is boiled down under reduced pressure at 50-60° C. A concentrate containing 78 per cent. vitamin A-acetate is obtained in a yield amounting to 95.5 per cent. By crystallizing from alcohol, 60-70 per cent. of the activity of the product may be obtained in the form of crystals of melting point 45-50° C.

Example 8

A solution of 1 part by weight of 1-palmitoxy-3,7-dimethyl-6-hydroxy-9-(2',6',6'-trimethyl-cyclohexene-(1')-yl)-nonatriene-(2,4,7) in 5.2 parts by weight of chloroform are vigorously stirred for 3-7 minutes at 0° C. with 7.2 parts by weight of concentrated hydrochloric acid ($d=1.6$). The two layers are separated, the chloroform solution is quickly dried over sodium sulphate, filtered and then stirred for two hours with 1 part by weight of calcium oxide while cooling with water and then for 24 hours at room temperature under nitrogen atmosphere. Calcium oxide is then filtered off, 0.5 per cent. d,l-α-tocopherol are added to the filtrate, whereupon the same is successively extracted with 2 parts by weight each of 1.5-n hydrochloric acid, saturated sodium bicarbonate solution and water. After drying over sodium sulphate and further addition of 0.5 per cent. d,l-α-tocopherol, the solution is boiled down under reduced pressure at 50-60° C. A concentrate containing 68-75 per cent. of vitamin A-palmitate is thus obtained with a yield of 95 per cent.

We claim:

1. Process of preparing pentaenes which comprises reacting in the cold a compound of the formula

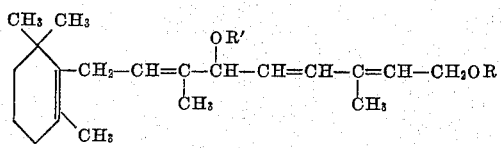

wherein R is selected from the group consisting of acyl and lower alkyl and R' is selected from the group consisting of acyl and hydrogen, dissolved in a halogenated hydrocarbon having a large dipole moment in the range of from about $1.18 \times 10^{-18}$ e. s. u. $\times$ cm. to about $1.74 \times 10^{-18}$ e. s. u. $\times$ cm. and which is liquid under the operating conditions, with an aqueous hydrogen halide selected from the group consisting of hydrogen chloride and hydrogen bromide, and treating the resulting halogen compound, dissolved in a halogenated hydrocarbon having a large dipole moment in the range of from about $1.18 \times 10^{-18}$ e. s. u. $\times$ cm. to about $1.74 \times 10^{-18}$ e. s. u. $\times$ cm. and which is liquid under the operating conditions, with a dehydrohalogenating agent selected from the group consisting of water and basic substances.

2. A process according to claim 1, wherein the hydrogen halide is hydrobromic acid.

3. A process according to claim 1, wherein the dehydrohalogenating step is performed in the cold.

4. A process according to claim 1, wherein a 1,6 - diacyloxy - 3,7 - dimethyl - 9 - (2',6',6' - trimethyl - cyclohexene - (1') - yl) - nonatriene-(2,4,7) is reacted with aqueous hydrogen bromide.

5. A process according to claim 4, wherein the dehydrohalogenating agent used is water.

6. A process according to claim 4, wherein the dehydrohalogenating agent used is a basic substance.

7. A process which comprises dehydrohalogenating a compound of the formula

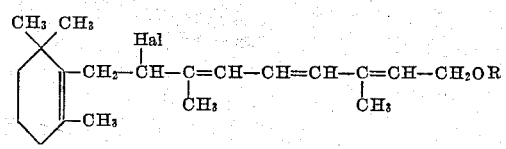

wherein Hal is a halogen selected from the group consisting of chlorine and bromine and R is selected from the group consisting of acyl and lower alkyl, dissolved in a halogenated hydrocarbon having a large dipole moment in the range of from about $1.18 \times 10^{-18}$ e. s. u. $\times$ cm. to about $1.74 \times 10^{-18}$ e. s. u. $\times$ cm. and which is liquid under the operating conditions, by means of a reagent selected from the group consisting of water and basic substances.

8. A process which comprises dehydrobrominating a 1-acyloxy-3,7-dimethyl-8-bromo-9-(2',6',6' - trimethyl - cyclohexene - (1') - yl) - nonatriene-(2,4,6) by treating the said compound, dissolved in a halogenated hydrocarbon having a large dipole moment in the range of from about $1.18 \times 10^{-18}$ e. s. u. $\times$ cm. to about $1.74 \times 10^{-18}$ e. s. u. $\times$ cm. and which is liquid under the operating conditions, with water in the cold.

9. A process which comprises dehydrobrominating 1 - acetoxy - 3,7 - dimethyl - 8 - bromo - 9 - (2',6',6' - trimethyl - cyclohexene - (1') - yl) - nonatriene-(2,4,6) by treating the said compound, dissolved in a halogenated hydrocarbon having a large dipole moment in the range of from about $1.18 \times 10^{-18}$ e. s. u. $\times$ cm. to about $1.74 \times 10^{-18}$ e. s. u. $\times$ cm. and which is liquid under the operating conditions, with water in the cold.

10. A process which comprises dehydrohalogenating a compound of the formula

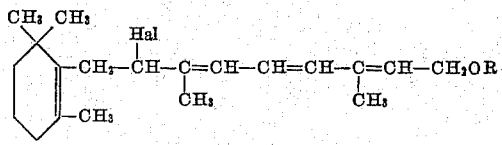

wherein Hal is a halogen selected from the group consisting of chlorine and bromine and R is selected from the group consisting of acyl and lower alkyl, dissolved in a halogenated hydrocarbon having a large dipole moment in the range of from about $1.18 \times 10^{-18}$ e. s. u. $\times$ cm. to about $1.74 \times 10^{-18}$ e. s. u. $\times$ cm. and which is liquid under the operating conditions, by means of a basic substance.

11. Process of preparing pentaenes which comprises reacting in the cold a compound of the formula

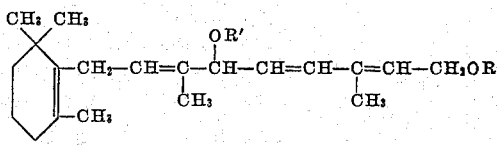

wherein R is selected from the group consisting of acyl and lower alkyl and R' is selected from the group consisting of acyl and hydrogen, dissolved in a halogenated hydrocarbon having a large dipole moment selected from the group consisting of chloroform, dichloromethane, dichloroethylene, and chlorobenzene, with an aqueous hydrogen halide selected from the group consisting of hydrogen chloride and hydrogen bromide, and treating the resulting halogen compound, dissolved in a halogenated hydrocarbon having a large dipole moment selected from the group consisting of chloroform, dichloromethane, dichloroethylene, and chlorobenzene, with a dehydrohalogenating agent selected from the group consisting of water and basic substances.

12. A process which comprises dehydrohalogenating a compound of the formula

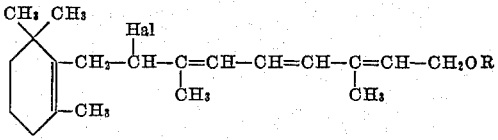

wherein Hal is a halogen selected from the group consisting of chlorine and bromine and R is selected from the group consisting of acyl and lower alkyl, dissolved in a halogenated hydrocarbon having a large dipole moment selected from the group consisting of chloroform, dichloromethane, dichloroethylene, and chlorobenzene, by means of a reagent selected from the group consisting of water and basic substances.

HERBERT LINDLAR.
RUDOLF RÜEGG.

REFERENCES CITED

The following references are of record in the file of this patent:

UNITED STATES PATENTS

| Number | Name | Date |
|---|---|---|
| 2,451,739 | Isler | Oct. 19, 1948 |
| 2,451,741 | Huber | Oct. 19, 1948 |